United States Patent

[11] 3,617,569

| [72] | Inventors | Stacy L. Daniels;<br>Daniel G. Parker, both of Midland, Mich. |
|---|---|---|
| [21] | Appl. No. | 60,093 |
| [22] | Filed | July 31, 1970 |
| [45] | Patented | Nov. 2, 1971 |
| [73] | Assignee | The Dow Chemical Company<br>Midland, Mich. |

[54] REMOVAL OF PHOSPHATE FROM WASTE WATER
9 Claims, No Drawings

[52] U.S. Cl. .................................................. 210/53, 23/19, 23/105, 23/109
[51] Int. Cl. .................................................. C02c 1/40
[50] Field of Search. ....................................... 23/19, 109, 105; 210/42, 52, 53, 49

[56] References Cited
UNITED STATES PATENTS

| 3,155,454 | 11/1964 | Salutsky et al. | 23/105 X |
| 3,259,568 | 7/1966 | Jordan et al. | 23/109 X |
| 3,402,026 | 9/1968 | Goren | 23/19 R X |
| 3,488,717 | 1/1970 | Wukasch et al. | 210/53 |
| 3,506,570 | 4/1970 | Wukasch | 210/53 X |

*Primary Examiner*—Michael Rogers
*Attorneys*—Griswold and Burdick, D. H. Thurston and Richard W. Hummer ABSTRACT: Phosphates are removed from an aqueous stream by a two-stage precipitation process whereby the bulk of the phosphates are first precipitated by addition of a soluble aluminum, calcium or iron salt and phosphates still remaining in solution are then precipitated by addition of a soluble lanthanide metal salt or other such salt. Separation of the precipitated phosphates is facilitated by use of a water-soluble organic anionic polyelectrolyte flocculating agent such as a partially hydrolyzed polyacrylamide.

REMOVAL OF PHOSPHATE FROM WASTE WATER

BACKGROUND OF THE INVENTION

The proper handling and disposal of the constantly increasing volumes of municipal and industrial sewage have been recognized of late as major problems. A particular disadvantage resulting from the return of untreated or insufficiently treated sewage to streams or lakes is the proliferation of algae and other undesirable vegetation in the receiving water caused by plant nutrients abundantly present in such aqueous waste, especially nitrates and phosphates. There is, therefore, considerable interest in methods whereby the concentrations of such nutrients are reduced as low as possible during sewage treatment.

At the present time, no method is known by which the nitrate concentration in sewage can be significantly reduced economically. However, phosphates are known to be precipitated from aqueous solution in relatively easily removable form by the addition of certain metal compounds, notably water-soluble compounds of iron, aluminum, and calcium. The separation of the resultant finely divided insoluble phosphates can be facilitated by the use of flocculants, for example, high molecular weight polymeric polyelectrolytes such as partially hydrolyzed polyacrylamides. Fortunately, because of the principle formulated as Liebig's Law of the Minimum which states that productivity in a biological system is controlled by the minimum essential nutrient present in that system, reduction of phosphate concentration in a stream controls plant growth effectively even though the nitrate content may remain essentially unchanged by the process. Relatively efficient removal of dissolved phosphate is provided by these known methods although small amounts of phosphate ion are still present in the treated solutions.

It is also known that certain other metal phosphates, namely the phosphates of the lanthanide metals, are even less soluble than the phosphates of iron, aluminum, and calcium and that, theoretically, a soluble compound of lanthanum, for example, could be used to obtain even more complete precipitation of dissolved phosphate. The use of these rare earth metal compounds alone as sole phosphate precipitating agents, however, is economically impractical at the present time.

SUMMARY OF THE INVENTION

It has now been found that unexpectedly efficient phosphate precipitation is accomplished by a process which comprises precipitating the major proportion of the phosphate ion present in an aqueous stream by adding to that stream at least about two equivalents of aluminum, iron, or calcium ion based on the phosphate ion present and thereafter, following intervening mixing for at least about one-half minute, adding to the stream at least about one equivalent of lanthanide metal, yttrium, scandium, or hafnium ion or mixture thereof, thereby precipitating most of the phosphate ion then remaining. A second mixing period of at least about one-half minute is desirable in conjunction with this second precipitation step. Separation of the precipitated phosphates is accomplished by any conventional means, for example, by settling and decantation or by filtration. The separation is facilitated by the use of a flocculating agent.

DETAILED DESCRIPTION

Surprisingly, no intermediate separation of the first phosphate precipitate is necessary to obtain optimum results. It might be expected that there would be sufficient dissociation of the primary aluminum, iron, or calcium phosphate precipitate to cause ultimate conversion of all of the available soluble secondary precipitant (lanthanide metal or other such metal as defined) to the insoluble phosphate and a consequent further dissociation of the primary phosphate to reestablish the soluble phosphate concentration to the level present prior to the secondary precipitation. Apparently, the expected dissociation either does not occur or it takes place so slowly that it has no significant effect during practical operation of the process.

A second unexpected feature of the new two-stage precipitation is the fact that under some conditions, there is precipitation of more phosphate during the second precipitation step than can be accounted for stoichiometrically based on the quantity of secondary precipitant added. Under these conditions, there seems to be a synergistic cooperation between the primary and secondary precipitants whereby more total phosphate is precipitated than one would expect from the observed effects of each precipitant used alone, although in no case was over all (primary plus secondary) stoichiometry exceeded.

The process is adaptable to operation within a wide range of pH. For optimum results at a particular pH, a primary precipitant is employed which is most effective at that pH level and otherwise most desirable. For example, an iron salt is most effective to precipitate phosphate at pH 4-6, an aluminum salt is most effective when used in a system of pH 5-7, and calcium is most effective at pH 8 or above. For most sewage and waste streams, iron is the preferred primary precipitant and it can be used generally within the pH range 3-9, either in the ferrous or the ferric state. The ferrous or ferric ion can be supplied by any water-soluble iron compound, usually the chloride, sulfate, nitrate, or acetate. Similarly, the aluminum or calcium ion is generally most conveniently provided by the corresponding chloride, nitrate, acetate, or also, in the case of aluminum, the sulfate or a soluble aluminate such as sodium aluminate.

The quantity of primary precipitant to be employed is at least two equivalents per equivalent of phosphate. The term "phosphate" is used herein to mean orthophosphate unless otherwise specified, the form in which most dissolved phosphorus is present in sewage and other aqueous wastes. Polyphosphates may also be present and can be calculated in terms of orthophosphate for the purpose of this process. Preferably, about two-four equivalents of primary precipitant ion are used.

Similarly, the secondary precipitant metal can be added in the form of any water-soluble salt, usually a chloride, nitrate, or acetate. The metals of Group III B of the periodic table (yttrium, scandium, and the lanthanide metals, i.e., elements 57-71) plus hafnium are generally equivalent in the process. A lanthanum salt or, for economic reasons, a so-called "rare earth metal" salt can be employed where the metals present are essentially lanthanum, cerium, praseodymium, and neodymium, with lanthanum being the predominant metal. The quantity of secondary precipitating metal used is at least one equivalent per equivalent of dissolved phosphate remaining after the primary precipitation and preferably about one-two equivalents. The secondary precipitant is effective at any pH greater than 3, in other words, wherever the primary precipitants are effective. The secondary precipitants, generally speaking, are not as subject as either iron or aluminum to undesirable competitive precipitation as insoluble hydroxides rather than as the preferable phosphate salts.

The process is applicable to any large scale aqueous system in which the dissolved phosphate concentration is to be reduced to the lowest possible value. Municipal and industrial sewage is the area of primary interest. Other applications include some mineral separation processes, and the restoration of eutrophic lakes and streams. Other applications will be apparent to one skilled in the art.

An illustrative operation of the new process under preferred conditions would include the following steps or procedures. The dissolved orthophosphate concentration in the aqueous stream of interest is determined by any convenient analytical method, for example, reduction of the ammonium phosphomolybdate complex. The pH of the solution is adjusted, if necessary, depending on the primary precipitant to be used. The calculated quantity of two-four equivalents or primary precipitant per equivalent of dissolved orthophosphate is then added, usually ferric chloride or aluminum sulfate, and the resulting mixture is stirred or otherwise agitated for at least one-half and preferably 5 minutes. The remaining dissolved phosphate can then be determined as before by analysis of a filtered sample or by estimation based on experience with similar systems. The calculated one-two equivalents of rare earth metal ion is then supplied to the mixture in the form of a suitable salt and the whole is stirred as before. At this point, the precipitated phosphates are removed by settling or by filtration. Best results are obtained when the separation step is preceded by the addition of an anionic polymeric polyelectrolyte to agglomerate the finely divided precipitate into more easily settled or filtered particles.

The anionic polyelectrolyte most suitable for this purpose is a copolymer of 20-50 mole percent acrylic acid or methacrylic acid and the remainder acrylamide or methacrylamide or a partially hydrolyzed polyacrylamide or polymethacrylamide of corresponding structure. The sodium salt form of such a polymer is ordinarily used. Polymers having an average molecular weight of at least about 2 million as determined by standard light scattering technique are commercially available for this purpose. Only a small amount of polyelectrolyte flocculant is needed; for example, 0.1-1 parts per million based on the weight of the aqueous system gives good results.

Examples of other high molecular weight anionic polymeric polyelectrolytes that can be used include the water-soluble homopolymers and copolymers of alkali metal styrenesulfonates, acrylates, and methacrylates. Suitable comonomers may be any water-soluble or water-insoluble monoethylenically unsaturated monomer copolymerizable with one of the foregoing to produce water-soluble polymers. Common comonomers include acrylonitrile, methacrylonitrile, styrene, vinyl acetate, oxazolidinone, pyrrolidinone, and the like. Other anionic polymers include the alkali metal and ammonium salts of high copolymers of styrene and substituted styrenes with maleic acid. Also effective although less commonly used are the homopolymers and copolymers of the sulfoalkyl acrylates and carboxyalkyl acrylates such as sodium sulfoethyl acrylate and sodium carboxyalkyl acrylate. Still other water-soluble synthetic polymers taught by the art to be useful as anionic flocculants include the carboxyalkyl cellulose ethers such as carboxymethyl cellulose, carboxymethyl methyl cellulose, carboxymethyl hydroxyethyl cellulose and similar derivatives of other polysaccharides such as starch.

An additional benefit of this process is that the use of a lanthanide metal salt can facilitate the removal of soluble phosphate esters from an aqueous waste such as the effluent of an industrial plant producing such esters. Ordinarily, these esters remain dissolved and are not affected by precipitants such as aluminum, iron, or calcium ions. However, it is known that the lanthanum ion, particularly in alkaline solutions, greatly increases the rate of hydrolysis of organic phosphates. The hydrolyzed phosphate is then subject to precipitation by either primary or secondary precipitant metal. The same applies also to condensed inorganic phosphates such as pyrophosphates, metaphosphates, and polyphosphates which have a tendency to form soluble complexes rather than separable precipitates in the presence of some metal ions.

Table 1 shows the contrast in phosphate precipitating efficiency between aluminum and lanthanum. In these experiments, aluminum sulfate or lanthanum nitrate were added in various metal-to-phosphate ratios to series of different phosphate-containing solutions. The three kinds of solutions were (1) 0.0002 molar sodium phosphate, (2) same as (1) plus 0.2 g./liter $HCO_3^1$, and (3) raw municipal sewage of hardness 230-350 mg./l. as $CaCO_3$, alkalinity 200-240 mg./l. as $HCO_3^1$, and containing 17-19 mg./l. dissolved orthophosphate. All solutions were run at 6.5 pH and were stirred for 5 minutes after addition of aluminum or lanthanum salt. All solutions were filtered through $0.45\mu$ cellulose acetate membranes prior to phosphate analysis. In these experiments, since the phosphate group and both precipitant metals all have a valence of 3, the ratio of equivalent weights is the same as the ratio of atomic weight of metal to molecular weight of phosphate.

TABLE 1

| Gram atoms of metal added per g. mole of phosphate | Percent original phosphate remaining in solution | | | | | |
|---|---|---|---|---|---|---|
| | Pure $PO_4$ sol. | | $PO_4+HCO_3$ | | Sewage | |
| | La | Al | La | Al | La | Al |
| 0.5 | ~50 | 73 | ~50 | | 50 | 70 |
| 1 | 0.8 | 29 | 8.5 | 62 | 3.5 | 38 |
| 1.5 | 0.38 | 5.8 | 0.27 | 18.5 | 0.4 | 15.5 |
| 2 | 0.27 | 1.5 | 0.08 | 2.7 | 0.13 | 3.6 |
| 2.5 | 0.15 | | 0.04 | 0.9 | 0.08 | |
| 3 | 0.13 | 1 | 0.04 | 0.6 | 0.06 | 0.45 |

It is evident from the above data that lanthanum has an advantage over aluminum as a phosphate precipitant generally and it is particularly advantageous in a bicarbonate-buffered solution. Since sewage wastes normally contain significant concentrations of bicarbonate ion, this is a point of some practical importance. The other lanthanide series metals and other metals of this invention as defined above also show this advantage. Calcium and iron are substantially equivalent to aluminum in this respect.

EXAMPLE 1

A sample of raw municipal sewage contained 13.7 mg./liter of soluble orthophosphate and had an alkalinity of 169.3 ml./liter as bicarbonate ion, pH = 7.24. To this sample was added sufficient aqueous aluminum sulfate to provide 2.5 gram atoms of Al per mole of $PO_4$. The resulting mixture was stirred for 5 minutes and a portion was filtered through a cellulose acetate membrane filter of $0.45\mu$ average pore diameter. The soluble phosphate present in the filtrate amounted to 0.59 mg./liter, indicating removal of about 96 percent of the original phosphate.

To the unfiltered mixture remaining there was then added an aqueous solution of lanthanum nitrate calculated to contain 1.5 gram atoms of lanthanum per mole of phosphate remaining in solution after the precipitation with aluminum sulfate. The mixture was then stirred for 5 minutes and filtered through a cellulose acetate membrane filter as previously described. Determination of dissolved phosphate remaining in the filtrate revealed a total of 0.04 mg./liter, a removal of about 93 percent of the residual dissolved phosphate left by aluminum precipitation and an overall removal of 99.7 percent of the original dissolved phosphate by the two-step precipitation.

EXAMPLE 2

To each of several portions of aqueous solution containing about 25 mg./liter of dissolved orthophosphate and having an alkalinity of 200 mg./liter as bicarbonate, pH = 8.3, there was added more or less aqueous aluminum sulfate to provide samples covering a range of aluminum-phosphate ratios. The samples were stirred for 5 minutes and a portion of each was filtered as described in example 1 to determine the amount of phosphate remaining in solution.

To the unfiltered mixtures remaining there was added in each case an aqueous solution of lanthanide metal nitrate sufficient to provide 2.5 mg. of Ln (lanthanide metal) per liter of solution. These solutions were then stirred for 5 minutes and samples were filtered as before in order to determine the phosphate remaining in solution. The rare earth nitrate used was a commercially available mixture containing 48 percent of lanthanum, 33 percent of cerium, 13 percent of praseodymium, 4.5 percent of neodymium, and the remainder other rare earth metals based on the total metals present. One blank determination was run in which no aluminum sulfate was first added to the solution.

TABLE 2

| Test | Gram atoms/ mole $Al/PO_4$ | Percent $PO_4$ removed | Gram atoms/ mole $Al+Ln/ PO_4$ | Percent $PO_4$ removed, total | Mole ratio $PO_4$ prec./ Ln |
|---|---|---|---|---|---|
| 1 | 0 | | 0.067 | 6 | 0.88 |
| 2 | 0.74 | 50 | 0.81 | 66.1 | 2.28 |
| 3 | 1.48 | 88.4 | 1.55 | 96.8 | 1.21 |
| 4 | 2.23 | 98.7 | 2.30 | 99.4 | 0.10 |

25.1 mg./l. $PO_4$ was present initially in Test No. 1, 23.6 mg./l. in the others.
2.50 mg./l. Ln was added in Test No. 1, 2.46 mg./l. in the others.

In tests No. 2 and 3, as shown in the last column of the above table, more phosphate was precipitated in the lanthanide metal precipitation step than could be accounted for stoichiometrically by the quantity of lanthanide metal alone.

EXAMPLE 3

The procedure of example 2 was repeated using $FeCl_3$ rather than $Al_2(SO_4)_3$ as the primary phosphate precipitant and using starting solutions containing 16.5–25.1 mg./liter of dissolved orthophosphate. The starting solutions had a pH = 8.3 and an alkalinity as $HCO_3^1$ of 200 mg./liter as before. In all tests, lanthanide metal nitrate was added in a quantity equivalent to 2.5 mg. Ln/liter.

TABLE 3

| Test | Gram atoms/ mole Fe/PO$_4$ | Percent PO$_4$ removed | Gram atoms/ mole Fe+Ln/ PO$_4$ | Percent PO$_4$ removed, total | Mole ratio PO$_4$ prec. Ln |
|---|---|---|---|---|---|
| 1 | 0 | | 0.018 | 6.0 | 0.88 |
| 2 | 0.494 | 6.4 | 0.512 | 14.5 | 0.84 |
| 3 | 0.772 | 6.7 | 0.79 | 39.4 | 3.23 |
| 4 | 1.09 | 15.1 | 1.11 | 87.8 | 7.48 |
| 5 | 1.63 | 46.5 | 1.65 | 91.3 | 4.61 |
| 6 | 2.17 | 90.2 | 1.67 | 94.0 | 0.40 |
| 7 | 2.72 | 94.7 | 2.74 | 98.9 | 0.42 |
| 8 | 3.26 | 98.8 | 3.28 | 99.8 | 0.10 |

Initial PO$_4$ concentrations were as follows: Test Ko. 1, 25.1 mg./liter; Test No. 3, 16.5 mg./liter; all others, 17.2 mg./liter.

In tests No. 3, 4, and 5, as shown in the last column of the above table, more phosphate was precipitated upon lanthanide metal addition than could be accounted for stoichiometrically by the lanthanide metal alone.

Results closely similar to those shown in examples 2 and 3 are obtained when the procedures of those examples are repeated using as the primary precipitant in the same equivalent quantities as before a calcium compound such as calcium chloride or a ferrous salt such as ferrous chloride or ferrous sulfate. Also, as previously described, the separation of metal phosphates precipitated by these procedures is facilitated by the use of an anionic water-soluble polymeric polyelectrolyte flocculant in a quantity conventionally used for such purpose.

We claim:

1. In a process wherein phosphate ion is removed from an aqueous stream by addition thereto of a water-soluble metal salt, thereby precipitating the corresponding substantially water-insoluble metal phosphate, the improvement wherein there is first added to the aqueous stream at least about two equivalents of aluminum, iron, or calcium ion as a primary precipitant based on the phosphate ion in said stream and thereafter, following intervening mixing for at least about one-half minute, adding to the stream at least about one equivalent of lanthanide metal, yttrium, scandium, or hafnium ion or mixture thereof as a secondary precipitant based on the residual phosphate ion present, mixing for at least about one-half minute, and separating metal phosphates thereby precipitated from the stream.

2. The process of claim 1 wherein the primary precipitant is added in a quantity of two-four equivalents and the secondary precipitant is added in a quantity of one-two equivalents.

3. The process of claim 1 wherein the primary precipitant is aluminum.

4. The process of claim 1 wherein the primary precipitant is iron.

5. The process of claim 1 wherein the secondary precipitant is a lanthanide metal.

6. The process of claim 5 wherein the lanthanide metal is predominantly lanthanum.

7. The process of claim 1 wherein the phosphate precipitate separation is preceded by addition to the stream of an anionic water-soluble polymeric polyelectrolyte flocculant.

8. The process of claim 7 wherein the polyelectrolyte is a copolymer or a corresponding partly hydrolyzed polyacrylamide or polymethacrylamide of which the molecular structure consists essentially of 20–50 mole percent of acrylic acid or methacrylic acid units and 80–50 percent of acrylamide or methacrylamide units and has an average molecular weight of at least 2 million.

9. The process of claim 1 wherein the aqueous stream contains a significant concentration of bicarbonate ion.

* * * * *